Figure 1:
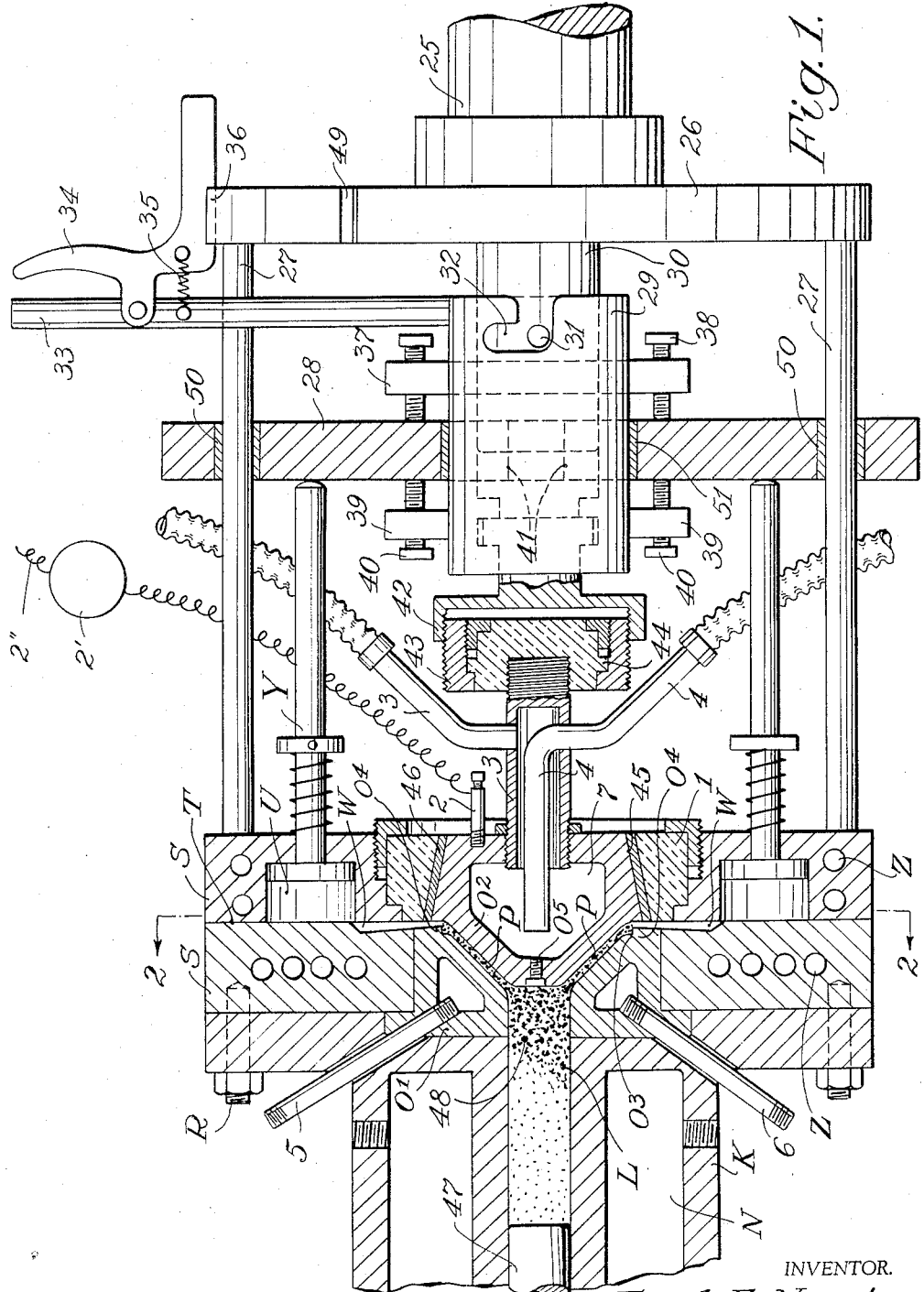

Dec. 4, 1945.  E. E. NOVOTNY  2,390,266
MANUFACTURE OF MOLDED COMPOSITION FRICTION BODIES
Original Filed July 2, 1943  3 Sheets-Sheet 1

INVENTOR.
Emil E. Novotny
BY James A. Franklin
ATTORNEY.

Dec. 4, 1945.    E. E. NOVOTNY    2,390,266
MANUFACTURE OF MOLDED COMPOSITION FRICTION BODIES
Original Filed July 2, 1943    3 Sheets-Sheet 2

INVENTOR.
Emil E. Novotny
ATTORNEY.

Dec. 4, 1945.  E. E. NOVOTNY  2,390,266
MANUFACTURE OF MOLDED COMPOSITION FRICTION BODIES
Original Filed July 2, 1943  3 Sheets-Sheet 3

INVENTOR.
Emil E. Novotny
BY James V. Franklin
ATTORNEY.

Patented Dec. 4, 1945

2,390,266

UNITED STATES PATENT OFFICE 2,390,266

MANUFACTURE OF MOLDED COMPOSITION FRICTION BODIES

Emil E. Novotny, Prospectville, Pa., assignor to Durite Plastics, Incorporated, Philadelphia, Pa., a corporation of Pennsylvania Original application July 2, 1943, Serial No. 493,192. Divided and this application August 21, 1943, Serial No. 499,469

11 Claims. (Cl. 18—55)

This invention relates to the manufacture of molded composition friction or tractive-surface bodies such as brake linings, brake blocks, clutch facings, etc.

Friction or tractive-surface articles have been made by a number of methods including that involving the mixing of a heat-reactable binder with asbestos fibres, with or without fillers, and then molding the same under heat and pressure to the desired shape. A common form of binder for this purpose is a potentially reactive synthetic resin. In making such friction bodies, relatively long-fibred asbestos and a potentially reactive synthetic resin are carefully mixed. It is generally desirable to use a minimum amount of binder and a maximum amount of asbestos fibres and fillers, the proportion of the latter to the resin binder being usually about ten to one. The very form and shape of the fluffy asbestos fibres, particularly in the relatively high amounts used, makes it difficult to uniformly distribute the binder resin throughout the mass. If the binder is not uniformly distributed, then the resultant friction article will vary in hardness or density, the frictional properties of the material will be erratic, the wear in service will be impaired and the difficulties in manufacture will be increased. To obtain a proper moldable mix, and a resultant product of uniform hardness or density, is very difficult through prior or present methods of molding, even though the molding composition is carefully weighed out in small quantities, section for section, of friction stock material.

If in these prior methods of molding friction articles, a liquid potentially reactive synthetic resin such as a phenol-aldehyde resin is used in the limited amounts possible, then an intimate uniform mixture is difficult to secure, since the liquid resins in general are relatively quite viscous, and the volume of the resin is small compared to the mass of fluffy asbestos fibres to be wetted and covered. If a solvent is used to increase the volume and decrease the resin viscosity, then an undesirable additional operation is required to remove the solvent. In either case, during the heat reaction process, whenever a liquid resin is employed there is an excessive evolution of gases and water vapor which tend to make the friction material blistered or laminated. If dry potentially reactive synthetic resins are employed, then it is increasingly difficult to secure an intimate mixture and to uniformly wet the asbestos fibres with the binding resin. Since there is much less evolution of gases during curing with the use of dry resins, these are preferred in practice but these have to be employed with selected types of fluxes or plasticizers which in themselves are troublesome.

The prime object of my present invention centers about the provision of a method of making molded friction or tractive-surface bodies employing a resin as a bond, in which an initial or only fairly intimate mixture of asbestos fibres and dry resin binder is heated and molded under conditions of minimum pressure and in such a way that the asbestos fibres become uniformly wetted with the binding resin and become thereby also more intimately and thoroughly intermixed to produce a homogeneous mass which is uniformly compressed into the desired molded friction body of uniform hardness or density.

In accordance with the principles of my present invention, an initial mix of asbestos fibres and binder is heated in an enclosed heating chamber of relatively large area and volume under low pressure, the pressure being generated in and derived from a material feed and pressure channel in open communication with the heating chamber, the heating chamber leading to and communicating with the mold cavity or mold space of the apparatus. By this method the initial mix of asbestos fibres and resin binder thus enters the heating chamber at a low pressure, with little or no back pressure, and there the dry resin fuses or melts, flowing and uniformly wetting the long asbestos fibres, becoming also thereby more thoroughly intermixed therewith, the thus thoroughly intermixing mass being uniformly compressed by the low operating pressure into a homogeneous state as the mass moves through the heating chamber and is fed into the mold cavity or is fed through orifices and drawn therefrom, to form products of the desired density, finish and form.

A further object of my present invention centers about the provision of a method of making molded friction or tractive-surface bodies above referred to, in which the heating chamber of the desired large area and volume consists of an electrostatic field of relatively large area and volume defined by spaced electrodes of correspondingly large area and in which the mix is flowed through said field under the developed relatively low pressure to produce the homogeneous fibre-resin impregnated friction body.

A further object of the invention resides in the provision of a method of this character in which the heating in the heating chamber or electrostatic field may be sufficiently high in temperature for exothermic reaction to take place, and for the material to cure rapidly even though the mold cavity be unheated, whereby, if desired, the molded piece may be rapidly ejected from or through the mold cavity to permit final reaction to take place outside the mold.

In the practice of this part of the method, sufficient heat is supplied in the heating space, that is, the heating chamber or the electrostatic field, for rapidly filling the mold space or mold cavity and for thermosetting the friction body (the resin bond) without the use of further applied heat.

From one aspect of the invention, the method provides a low friction, nozzleless process of molding a fibre-resin impregnated mixture or mass. This is to be contradistinguished from the prior use in ejection methods of high pressures in ejection molding used in apparatus employing small nozzle openings. By my present improved method, the use of nozzle orifices is eliminated and there is provided large heating areas and an adjustable heating chamber with the fibre-resin mix flowing through in substantial thickness, permitting heating and molding operations to be carried out at relatively low pressures. My present invention is also to be contradistinguished from prior transfer or injection molding methods in which the plastic material is preheated, the mold cavity must be heated and a multiplicity of relatively small orifices are provided in the molding apparatus. By the method of my present invention, the preheating of the material is obviated, the orifices or nozzles effect eliminated, and there is permitted the molding of a fibre-resin mix which has been highly plasticized at high temperature, and which is delivered to the mold in the highest form of plasticity and homogeneity at low pressures, and into molds which may be relatively fragile.

This application is a division of my copending application Serial No. 493,192, filed July 2, 1943.

Figure 2:
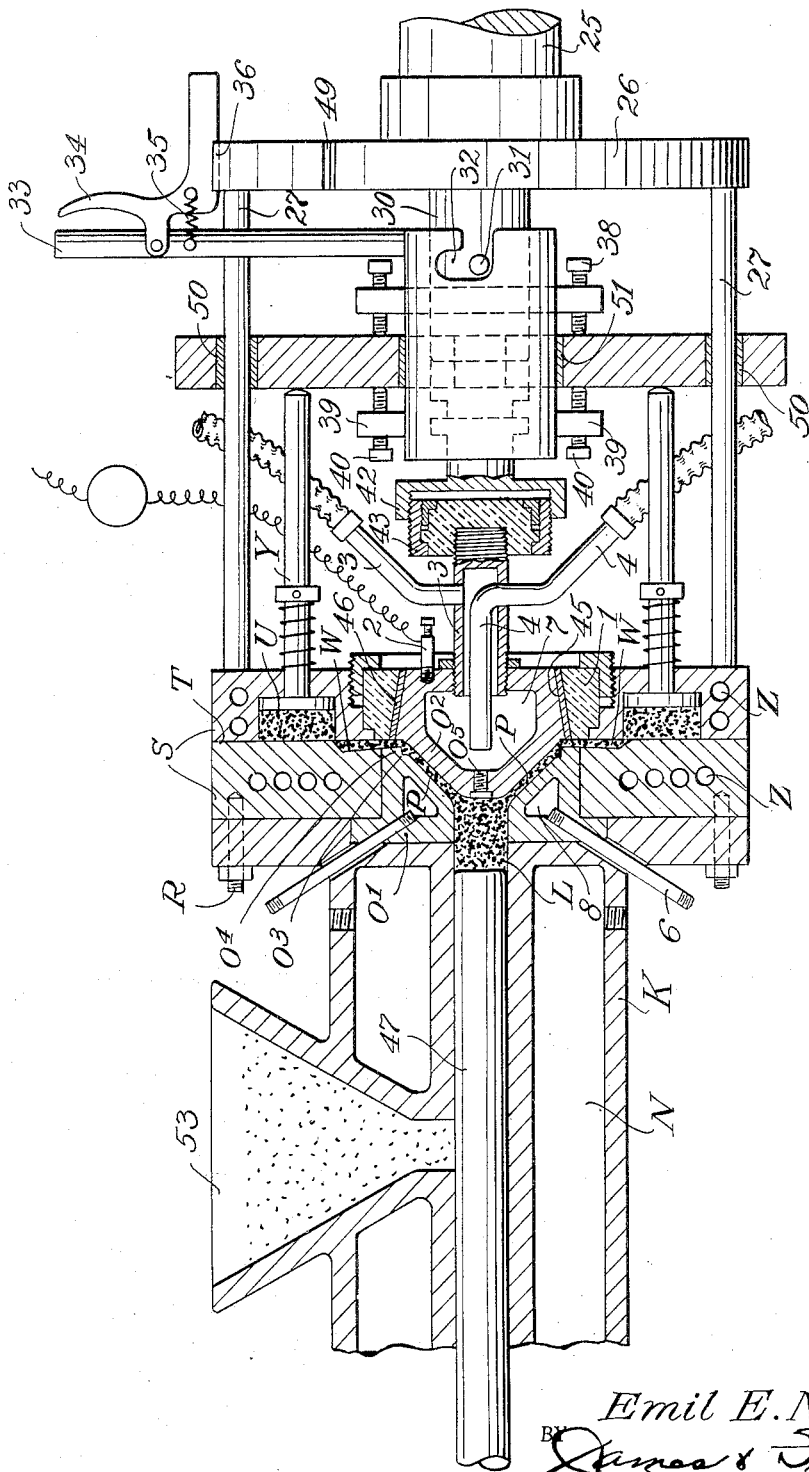
Figure 3:
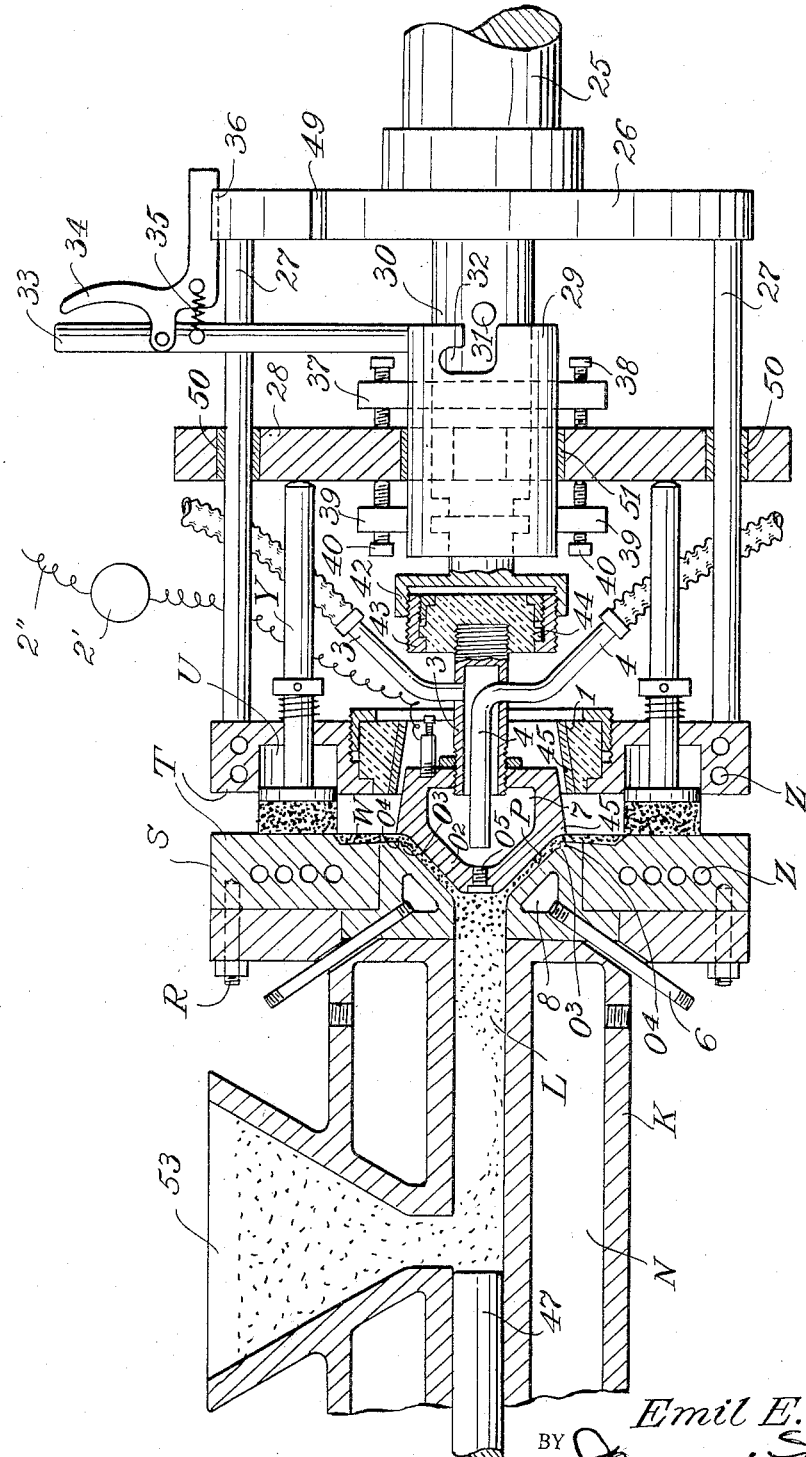

To the accomplishment of these objects and such other objects as may hereinafter appear, my invention relates to the method of molding composition friction or tractive-surface bodies hereinafter more particularly described in the specification and sought to be defined in the claims. The specification is accompanied by drawings in which:

Figure 1 is a partly sectioned, longitudinal cross-sectional view of the essential parts of a molding apparatus used in practicing the method, showing the position of the parts after a molding cycle and at the start of the new cycle;

Figure 2 is a partly sectioned, longitudinal cross-sectional view of the apparatus showing the position of the parts when the mold cavities have been filled; and Figure 3 is a partly sectioned, longitudinal cross-sectioned view of the apparatus showing the position of the parts when the molded parts are being ejected after completion of the molding cycle but with the elements of the heating space remaining closed.

The method of my present invention may be described by reference to the corelated parts of the apparatus depicted in the drawings. An initial or only fairly intimate mixture of asbestos fibres and dry resin flows from a pressure channel L through a heating chamber P of large area and volume defined by the units $O'$ and $O^2$ to one or more mold cavities U by way of the connecting passages W. The pressure channel L, which is both a material feed and pressure channel, opens directly into the heating chamber P, and the said heating chamber acts to heat the asbestos-resin mix therein under the low pressure generated or produced in the feed and pressure channel L. The heating chamber P leads to and communicates with the mold cavities U by way of the passages W. The units $O'$ and $O^2$ in the form of the invention here shown comprise electrodes for electrostatically heating the asbestos-resin mix in the chamber P, the unit $O'$ being a grounded electrode and the unit $O^2$ being an insulated electrode. The units or electrodes $O'$ and $O^2$ are movable one relatively to the other for the purposes referred to, the unit or electrode $O^2$ in the form of the invention depicted in the drawings being the movable unit and the unit or electrode $O'$ being the fixed unit. The mold cavities U are defined by the two mold members S having the parting line T, one of which members is fixed and the other of which is movable; and associated with the movable mold member there are provided the ejectors Y, one for each mold cavity. The mold cavities U may be suitably shaped to produce the desired shape of the particular friction body; the shape illustrated may be considered useful for the making of brake blocks.

The material feed and pressure channel L is formed centrally in a cylinder K cored as at N, and the said cylinder K may be integrally provided with a material containing hopper 53 which opens into the pressure channel L. A ram or plunger 47 operates in the pressure channel L to force feed the material gravitating thereinto from the hopper 53 (see Figs. 2 and 3) into the advance end 48 of the pressure channel L thereby placing the material under pressure at this end 48, as depicted in Fig. 2 of the drawings.

The molding cycle may now be described by reference to this part of the apparatus as shown in the sequential views of the drawings.

Fig. 1 shows these essential parts of the molding apparatus just after a molding cycle, the friction bodies formed in the mold cavities U and the sprue gates formed in the passages W having been ejected. The mold is closed and the asbestos-resin mix is being placed under pressure in the advance end 48 of the pressure channel L and thereby in the heating chamber P. To attain the desired pressure, the ram 47 is moving from the position shown in Fig. 3 to the position shown in Fig. 2 of the drawings. The material in the pressure channel L is preferably unheated. The material seen in the heating chamber P remaining from a previous charge is in a partially heated condition, and is retained in the chamber P through suitable back draft arrangements $O^3$ and breaking edges $O^4$ on the heating unit or grounded electrode $O'$. Where electrostatic heating is used, this partial heating of the material in readiness for the next mold cavity charge is accomplished through proper interval cycling of a timing switch 2′ leading to the connector 2 attached to the insulated electrode $O^2$, the electrodes $O'$ and $O^2$ being thereby connected to an electrostatic high frequency generator or suitable energy source indicated as 2″. During the cycling step depicted in Fig. 1, the volume of material in the heating chamber P is heated to the desired temperature, under the pressure generated in the pressure channel L, between the extensive surfaces provided by the heating units or electrodes $O'$ and $O^2$.

Fig. 2 of the drawings illustrates the condition where the molding stroke of the ram or plunger 47 has been completed and the heated material has been caused to flow into the mold cavities.

The mold cavities U have been filled and are under pressure exerted by the material in the advance end 48 of the pressure channel L. During the flow of the asbestos-resin mix into the mold, it is heated in transit in the heating chamber P. The cycling may be such that the material within the mold cavity passages W and the cavities U has been heated to a point of exothermic reaction, such that the molded parts in the mold cavities U as well as the gates within the passages W are ready for ejection from the mold. The ram 47 is also now in a position for a retracting stroke to take place.

Fig. 3 of the drawings shows the arrangement of the parts after the molding cycle has been completed. Here the friction bodies are being ejected from the mold cavities U by means of the ejectors Y. In this illustration the electrode O² is held in closed position with the material in the heating chamber P being heated. While the mold sections S, S are open, the heating cycle is so arranged as to bring the material in the heating chamber P up to a maximum temperature prior to its next charged flow to the mold cavities U. The ram 47 has been retracted to permit the entrance and feeding of fresh material from the hopper 53 into the channel L for the next pressure charge.

The heating chamber P may, if desired, also be opened together with the opening of the mold sections S, S, as will be explained hereinafter. In this case, the chamber P is opened either for the purpose of adjustment of the unit or electrode O², or inspection of the parts, or cleaning of the heating chamber and pressure channel. Ordinarily, opening of the heating chamber is not required. When opened, all of the material within the pressure channel L and the material adhering to the surfaces of the heating units O' and O² may be removed and the channels completely cleaned.

While the advantages of electrostatic high frequency heating are particularly advantageous to my invention, it is to be understood that the electrodes O' and O² may merely be heating surfaces, providing an enclosed heating chamber P for the material feeding under pressure to the mold, and that any suitable means of heating may be utilized. Advantages accrue from this method and construction due to the large area and volume exposed to heating, the elimination of nozzles and the utilization of substantially lower effective molding pressures, due to reduction of frictional losses.

While this method covers the molding of articles by injection, implying a closed mold cavity, it will be understood that this method may be utilized for molding by ejection where substantially continuous lengths of material having uniform cross-sectional shapes are to be molded. While the molds S, S may be unheated, it will be understood that the process broadly covers the molding of many types of materials and that therefore the heating or cooling of the molds is not precluded.

The apparatus may be utilized in any position. For some work calling for a large number of inserts a vertical arrangement with inserts maintained in the mold through gravity may be advantageous. Similarly, the drawings indicate the usual type of pressure cylinder plunger or ram. However, the exertion of pressure on the unplasticized mass and at relatively low operating pressures makes possible the use of a single or double screw pressure feed device, or a relatively short stroke, eccentric or otherwise operated vibrating pressure means may be used. The construction in its salient parts may be used in the form of the usual hydraulic press assembly, or may even be arranged to be operated in conjunction with a hand mold operated in a hydraulic press.

This nozzleless, non-clogging type of molding apparatus permits generally the molding of high impact materials utilizing long fibers or long fragments of woven or felted materials, as cloth, paper, etc., without breaking down the length of fibre, and the molding to uniform density without requiring the production of weighed out quantities of material which are later hand-preformed and subsequently molded. The method is thus particularly adapted for the manufacture of friction or tractive-surface bodies such as brake linings, brake blocks, clutch facings and the like. The initial mix of asbestos fibres and resin binders enters the heating chamber at a low pressure, with little or no back pressure, and there the dry resin fuses or melts, flowing and uniformly wetting the long asbestos fibres, becoming also thereby more thoroughly intermixed therewith, and the thus thoroughly intermixing mass is uniformly compressed by the low operating pressure into a homogeneous state as the mass moves through the heating chamber and is fed into the mold cavity or into the mold space.

Referring now more in detail to the apparatus, the parts already described may be constructed and organized to carry out the referred to functions and other desired operations to be described below.

The electrodes O' and O² are cored at 8 and 7, respectively, for the circulation of a fluid heating or cooling medium. A non-electrically conducting heating medium is utilized, which is flowed through the pipes or lines 3 and 4 connected to the insulated electrode O² and through the inlet and outlet pipes 6 and 5 connected to the grounded electrode O'. The heating or cooling of the cored pressure cylinder K may optionally be carried out by a separate means, as through the coring N; and likewise the mold S, S may be heated or cooled, as the particular requirements of the particular mix being molded call for, as at Z. The stationary part of section S of the mold is made conductively integral with the electrode O' and the cylinder K through the use of the assembly studs and nuts R so that the grounding of such mold section S or cylinder K also grounds the electrode O'. The heating and/or cooling of the cylinder K and the mold S, S may optionally be handled separately and this is true of the electrodes O' and O² to the extent that the use of high frequency electrostatic heating may even be eliminated for certain types of molding and the heating may be carried on by any suitable fluid or liquid. In this case also the arrangement may be such that the coring or heating openings 7 and 8 provide heating surfaces having most excellent conductive heat transfer efficiency and may therefore be alternately heated and cooled should the cycle of operations or the type of material call for this in order to permit molding efficiency or to prevent the setting up of the material within the heating passages or within the heating channel P. At 45 is indicated a straight conical joint between electrode O² and the retractable mold assembly, and at 46 is shown a bronze or other non-abrasive metal sleeve for taking up wear caused by the retraction of the mold when the positive electrode O² remains stationary.

Variations in plasticity and melting points of plastic materials, the speed of molding cycle, the size of the mold cavities U and other reasons to be reviewed presently often call for variation in the volume of material required to be delivered from heating channel P and therefore this channel is made adjustable. This may be done by the arangement of the threaded coupling 43 having an insulation filling 44, the said filling being rotatable (threadedly) on the electrode connected pipe 3, and the said coupling being rotatable (threadedly) on the internally threaded holder 42. By this or other equivalent means it is possible to adjust the cross-sectional thickness of the material within channel P of the heating chamber formed between electrodes O' and O². The insulation filling 44 as well as the insulation bushing I form the means for insulatably supporting the electrode O². The shape and form of electrodes O' and O² are also so designed as to permit the utmost in flexibility. These electrodes define a heating chamber or space of large area and volume and which area and volume increase in the direction of flow of the mix material. In this instance the heating chamber formed by electrode O² is in the form of a truncated cone with a complementary negative contour forming electrode O'. Many materials vary in insulation resistance and many of these products, even the phenolics, are indeed poor when heated to a high temperature so far as insulation resistance is concerned. Furthermore, it is desirable when utilizing high frequency electrostatic heating to be enabled to utilize a relatively high voltage and low frequency in order to heat throughout the mass, inasmuch as extremely high frequencies may under certain conditions provide only more or less surface heating. For these reasons the adjustment of the heating channel P should be arranged to provide wide variations. Where these electrodes, as indicated here, would have a surface area of approximately 14 sq. in. and the heating channel P would have a thickness ordinarily of approximately ⅛ inch, it will be found that where electrostatic heating is carried out with phenolic materials the thickness in passage P should be closer to ½ to 1 inch cross-section, particularly where the mold cavities require a large volume of material and the heating cycle is to be efficiently rapid. It is essential for greatest per diem production to so balance the time of heating, the cross section and volume to be heated against a safe optimum heating temperature in order to provide greatest uniformity in molding.

The apparatus provided allows the mold cavity to be opened without opening the heating chamber passage P. This opening of the mold cavity may be carried out by standard or conventional apparatus but is illustrated as being carried out by means of a movable ram 25, actuating plate 26, and connecting rods 27 which latter are attached to the movable section of the mold S. The rods 27 reciprocate in the bronze bushings 50, 50 provided in the stationary supporting plate 28. The line of separation between the movable mold section S and electrode O² is the conical joint 45. Reciprocation of the ram 25 opens and closes the mold S, S. When the mold is opened, the ejectors Y being anchored against the stationary plates 28 act to eject the molded pieces.

For opening the heating chamber P, I provide mechanism which comprises essentially a sliding coupling 29 connected to the holder 42 and selectively connectable to the ram 25. The sliding coupling 29 is slidable in the bronze bushing 51 provided in the supporting plate 28. The coupling 29 has a bayonet slot 32 in which pin 31 may ride freely back and forth. Pin 31 is attached to shaft 30 which in turn is attached to the actuating plate 26. Lugs 39 attached to coupling 29, together with set screws 40, maintain the predetermined static position of electrode O². A handle 33 carrying a pivoted trigger 34 rises from and is fixed to the coupling 29. The trigger 34 seats in either the slot 36 or the slot 49 in the periphery of the actuating plate 26. When the handle trigger 34, against the action of spring 35, is released from slot 36 and the handle 33 is drawn down to the point where handle trigger seats in slot 49, pin 31 is caused to enter the bayonet slot 32, engaging the coupling 29 with the shaft 30, causing lugs 39 to enter slots or orifices 41 in the plate 28; and electrode O² thus becomes free to retract with the mold cavity. Attached to coupling 29 is flange 37, provided with set screws 38, which serve to maintain the closed position of electrode O² as shown in Fig. 1.

In Fig. 3, the ram 47 is shown retracted permitting additional material to enter the pressure channel L from hopper 53. After that, under ordinary conditions, the plastic material is in a relatively unheated condition in the channel L. Such material may remain in the channel L for an unlimited length of time, and therefore the adjustment of material fed into cavity L need be only sufficient to take care of the molding capacity and a surplus of material will do no harm since there will be no danger of the product prematurely setting up within material cavity L. The material is preferably unheated in channel L.

My method does not necessarily call for the use of electrostatic high frequency heating, the heating chamber being utilized for direct conductive heating under relatively high efficiency for the reason that the material is under pressure, is homogeneous and is in close contact with the relatively large area of heating surface instead of being subjected to heat as through a nozzle while moving at high velocity. The controlled conductive heating, however, adds materially to the efficiency of electrostatic heating.

The operation of this method of heating therefore desirably calls for adjustability in the spacing of the electrodes, a uniform compression of the material between the electrodes, the accurate timing of the cycling of the electrostatic heating to maintain temperatures within safe maximums and minimums, and the heating of a substantial thickness and quantity of material between the electrodes, with such material remaining in the heating chamber for a sufficient length of time to attain maximum temperatures and therefore a velocity of material within the heating chamber substantially lower than what would be possible if a nozzle were used.

Distinguished from injection methods employing the usual high pressure, high velocity, small cross-sectional heat transfer superheating nozzle, the heating of the asbestos-resin mix following out the principles of the present invention is carried out in large volume through the use of heating surfaces of large area, variable as to cross-sectional thickness of material to be heated, and providing at low pressures a heated, thoroughly resin impregnated and homogeneous mass of required volume. In the method of the present invention the mix is flowed from the heating chamber at substantially its region of greatest area and volume, such region being in direct communication with the mold space or passage whereby the mix flows from said region directly into the mold space or passage.

The apparatus used in the present invention, when employed with high frequency heating, provides a relatively large electrode surface and an easily adjusted variable distance between the electrodes, thus permitting the heating of a relatively large and thick mass or mix of material to optimum molding temperatures while maintaining a closed heating chamber during the flow of material from the heating chamber to the mold cavity.

The method of making molded composition friction or tractive-surface bodies embodying the principles of my present invention and the numerous advantages flowing therefrom will, in the main, be fully apparent from the above detailed description thereof. It will be further apparent that many modifications and changes may be made in the method without departing from the spirit of the invention defined in the following claims.

I claim:

1. The method of making molded composition friction or tractive-surface bodies which consists in mixing asbestos fibres with a thermosetting resin, in delivering the mix under a relatively low pressure into a heating chamber of large area and volume and which area and volume increase in the direction of flow of the mix material, in flowing said mix through said chamber under said relatively low pressure, and into a mold space, heating said mix while in transit in said chamber, the heating of the mix in said chamber functioning to form therein a homogeneous fibre-resin impregnated friction body brought to a moldable condition, and flowing said mix from said chamber at substantially its region of greatest area and volume into said mold space, said region of the chamber of greatest area and volume being in direct communication with the mold space whereby the mix flows from said region directly in the mold space.

2. The method of making molded composition friction or tractive-surface bodies which consists in mixing asbestos fibres with a thermosetting resin, in delivering the mix in an unheated state and under a relatively low pressure into a heating space defined by two spaced surfaces of large area which area increases in the direction of flow of the mix material, in flowing said mix through said heating space under said relatively low pressure, and into a mold space, heating said mix while in transit through said heating space to a moldable condition, the heating of the mix in said heating space functioning to form therein a homogeneous fibre-resin impregnated friction body brought to the moldable condition, and flowing said mix from said heating space at substantially its region of greatest area into said mold space, said region of greatest area being in direct communication with said mold space whereby the mix flows from said region directly into said mold space.

3. The method of claim 1 in which sufficient heat is supplied in the heating chamber for thermosetting the resin without further applied heat.

4. The method of claim 2 in which sufficient heat is supplied in the heating space for rapidly filling the mold space and for thermosetting the friction body without further applied heat.

5. The method of making molded composition friction or tractive-surface bodies which consists in mixing asbestos fibres with a thermosetting resin, in delivering the mix under a relatively low pressure through an electrostatic field of relatively large area and volume which area and volume increase in the direction of flow of the mix material, in flowing said mix through said field under said relatively low pressure, and thence into a mold space, heating said mix while in transit through said field, the heating of the mix functioning to form within said electrostatic field a homogeneous fibre-resin impregnated friction body brought to a moldable condition, and flowing said mix from said field at substantially its region of greatest area and volume into said mold space, said region of said field of greatest area and volume being in direct communication with said mold space whereby the mix flows from said region directly into said mold space.

6. The method of claim 5 in which sufficient heat is supplied in said electrostatic field to rapidly fill the mold space and to thermoset the friction body without further applied heat.

7. The method of claim 5 in which the heat is generated in the electrostatic field by a high frequency circuit.

8. The method of making molded composition friction or tractive-surface bodies which consists in mixing asbestos fibres with a thermosetting resin, in delivering the mix under a relatively low pressure to an electrostatic field defined by spaced electrodes of relatively large area which area increases in the direction of flow of the mix material, in flowing said mix through said field under said relatively low pressure, and thence into a mold passage, heating said mix while in transit through said field, the heating of the mix functioning to form in said field a homogeneous fibre-resin impregnated friction body brought to a moldable condition, and flowing said mix from said field at substantially its region of greatest area into said mold passage, said region of said field of greatest area being in direct communication with said mold passage whereby the mix flows from said region into said mold passage.

9. The method of claim 8 in which a heat control fluid is flowed through said electrodes.

10. The method of claim 8 in which the mix is delivered to said field in a relatively unheated and unplasticized state.

11. In the method of claim 8 the added step of adjusting the electrostatic field and heating space by adjusting the spacing between the electrodes.

EMIL E. NOVOTNY.